United States Patent
Matthias et al.

(10) Patent No.: US 10,821,610 B2
(45) Date of Patent: Nov. 3, 2020

(54) METHOD OF DETERMINING A JOINT TORQUE IN A JOINT OF AN ARTICULATED INDUSTRIAL ROBOT

(71) Applicant: ABB Schweiz AG, Baden (CH)

(72) Inventors: Bjoern Matthias, Bad Schoenborn (DE); Hao Ding, Heidelberg (DE); Roger Mellander, Vaesteras (SE); Tomas Groth, Vaesteras (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/720,019

(22) Filed: Dec. 19, 2019

(65) Prior Publication Data

US 2020/0122337 A1    Apr. 23, 2020

Related U.S. Application Data

(63) Continuation of application No. PCT/EP2018/052877, filed on Feb. 6, 2018.

(30) Foreign Application Priority Data

Jun. 19, 2017 (EP) .................................... 17176600

(51) Int. Cl.
| | |
|---|---|
| B25J 13/00 | (2006.01) |
| B25J 13/08 | (2006.01) |
| H02P 29/40 | (2016.01) |
| B25J 9/02 | (2006.01) |
| B25J 9/16 | (2006.01) |

(52) U.S. Cl.
CPC ............ *B25J 13/085* (2013.01); *B25J 9/023* (2013.01); *B25J 9/1633* (2013.01); *H02P 29/40* (2016.02); *G05B 2219/37319* (2013.01); *G05B 2219/37632* (2013.01)

(58) Field of Classification Search
USPC .................................................. 700/245–264
See application file for complete search history.

(56) References Cited

U.S. PATENT DOCUMENTS 4,864,204 A * 9/1989 Daggett ............. G05B 19/4141
318/568.2
4,925,312 A * 5/1990 Onaga .................... B25J 9/1633
318/568.22

(Continued)

FOREIGN PATENT DOCUMENTS

| EP | 1696216 A1 | 8/2006 |
|---|---|---|
| WO | WO 2016110320 A1 | 7/2016 |

*Primary Examiner* — Jonathan L Sample
(74) *Attorney, Agent, or Firm* — Leydig, Voit & Mayer, Ltd.

(57) ABSTRACT

A method of determining a joint torque in a joint of an articulated industrial robot, the robot having a first arm and a second arm which are coupled to each other by the joint and which are movable relative to each other by an electric drive unit coupled to the first and second arm, includes: controlling the electric drive unit by an electronic control device; assigning a measuring device to the electric drive unit, the measuring device measuring an electric current supplied to the drive unit; determining an actual value of the torque which is applied to the second arm from the measured electric current; and comparing, using the electronic control device, the determined actual torque value with a predetermined desired torque value for the joint.

12 Claims, 3 Drawing Sheets

(56) References Cited

U.S. PATENT DOCUMENTS

| | | | | |
|---|---|---|---|---|
| 6,646,405 B2* | 11/2003 | McConnell | ............ | B25J 9/1635 |
| | | | | 318/568.2 |
| 9,200,972 B2* | 12/2015 | Inoue | .................... | G01L 5/0028 |
| 9,205,556 B1* | 12/2015 | Magnusson | ................ | G01L 3/16 |
| 9,745,081 B2* | 8/2017 | Best | ........................ | F16M 11/42 |
| 9,862,099 B1* | 1/2018 | Linnell | .................. | B25J 13/081 |
| 10,335,959 B2* | 7/2019 | Ogata | ........................ | B25J 9/126 |
| 2006/0071625 A1* | 4/2006 | Nakata | ............... | G05B 19/4061 |
| | | | | 318/568.12 |
| 2010/0141197 A1* | 6/2010 | Moon | .................... | B25J 9/1638 |
| | | | | 318/566 |
| 2013/0211739 A1* | 8/2013 | Nitz | ........................ | B25J 9/1641 |
| | | | | 702/41 |
| 2014/0039517 A1* | 2/2014 | Bowling | ................ | A61B 34/10 |
| | | | | 606/130 |
| 2014/0039681 A1* | 2/2014 | Bowling | ................ | B25J 9/1633 |
| | | | | 700/261 |
| 2014/0222207 A1* | 8/2014 | Bowling | ................ | B25J 9/1633 |
| | | | | 700/261 |
| 2014/0277739 A1* | 9/2014 | Kornbluh | ............. | A41D 13/002 |
| | | | | 700/260 |
| 2016/0089211 A1* | 3/2016 | Bowling | ............ | A61B 17/1626 |
| | | | | 606/130 |
| 2017/0047792 A1* | 2/2017 | Klassen | .................. | H02K 1/32 |
| 2018/0169864 A1* | 6/2018 | Haddadin | .............. | B25J 9/1653 |

\* cited by examiner

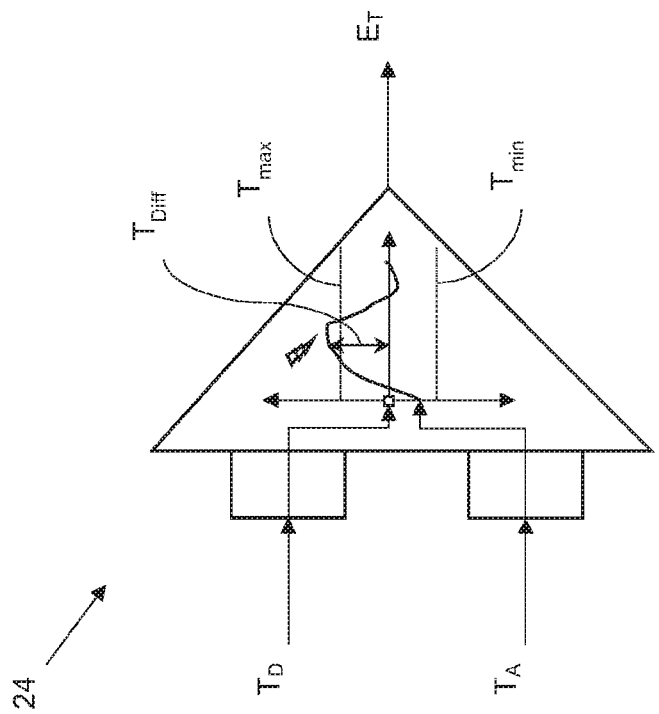

METHOD OF DETERMINING A JOINT TORQUE IN A JOINT OF AN ARTICULATED INDUSTRIAL ROBOT

CROSS-REFERENCE TO PRIOR APPLICATION

This application is a continuation of International Patent Application No. PCT/EP2018/052877, filed on Feb. 6, 2018, which claims priority to European Patent Application No. EP 17176600.9, filed on Jun. 19, 2017. The entire disclosure of both applications is hereby incorporated by reference herein.

FIELD

The present invention is generally related to a method of determining a joint torque in a joint of an articulated industrial robot.

BACKGROUND

In the area of collaborative robot applications, it is required to safeguard the operator working with such a robot in order to avoid any injuries which might be caused by the robot when sharing a common workspace with the operator.

One known protective scheme, which is referred to as power and force limiting according to ISO 10218-1:2011, permits an incidental contact between a human operator and the moving robot as long as the characteristics of such a contact lie below biomechanical requirements which preclude even minor injury.

In this respect, two possible types of contact events are relevant to applications which use a limitation of power and force. According to a first possibility, the robot is allowed to load the contacted body region of an operator for a short time period, for example for less than 50 ms. For such a transient contact, it is necessary to limit the energy which is transferred from the moving robot to the body region of the operator. This can be typically achieved by a safety function which limits the speed of the robot.

On the other hand, it is possible for the robot to load the contacted body region for a longer time period, which may be for example more than 50 ms, or even several 100 ms or more. For this quasi-static contact, it is required to limit the forces and pressures that the robot can apply to the body region of the operator. This is preferably achieved by a safety function which limits the robot's joint torques and/or the resulting Cartesian forces.

The design of the robot system, which includes a controller, a manipulator and an end-effector as well as other application-related equipment, must be such that the required limits are not exceeded during operation of the collaboration application.

However, for each of the contact cases, it is possible to provide a specific mechanical and electrical design of the robot which is inherently safe.

For example, in order to limit the speed of the robot movement, it is possible to design the drive system such that the robot manipulator is unable to exceed a certain kinetic energy, regardless of the details of the motion. This can be simply speaking considered as a mode of limited maximum motor speed at zero torque.

To limit the forces applied by the robot, it is possible to design the drive system such that it is unable to exceed a certain maximum joint torque level. This can be simply speaking considered as a mode of limited maximum motor torque at zero speed.

For each of the contact cases, it is also possible to provide a design of the robot system and the associated control system which sufficiently reduces the risk level of an injury by properly designed and implemented safety functions.

For example, to limit the speed, it is possible to measure the actual angular velocities of the robot joints and compare these values to the reference velocities demanded by the control system. Alternatively, two independent measurements of the joint velocities can be performed. If, for either of these approaches, the two independent values lie within a predetermined corridor, a proper operation of the safety-rated part of the control system can be assumed, the Cartesian speeds of a part of the robot manipulator can be computed, and a limitation on these speeds can be implemented easily. Such functionality is common in modern industrial robot controllers.

To limit the forces which are applied by the robot, it is further possible to measure the torques in the robot joints using sensors and compare these values to the torque values determined from the measured motor currents. This approach is known and is used in some of today's collaborative robots. It has the disadvantage that an additional sensor is needed, which represents an additional source of possible technical failures. Moreover, an additional sensor leads to additional costs of the robot.

In today's articulated industrial robots, a standard drive train comprises a motor, which drives a joint by means of a gearbox and a position sensor which measures the angular position of the drive shaft of the motor. A common electric current control loop which is usually employed in such a robot uses the actual angular position of the drive shaft, the speed of the motor and the electrical phase angle to compute the desired commutation of currents for each phase of the motor. The actual currents of the motor phases are measured, and on basis of a deviation between the actual motor currents and the desired motor currents, control currents are generated and fed to the motor.

Present solutions for obtaining safety-related information on basis of the motor torques are based on at least one sensor. For a safety-rated required dual-channel architecture, one channel uses the joint torque sensor information, while the other uses torque computed from motor currents.

More background information is given in the ISO 10218-1:2011, Robots and robotic devices—Safety requirements for industrial robots—Part 1: Robots, ISO, Geneva 2011.

To solve the problem of supervising torques in a joint of an articulated industrial robot, it is known to:

observe the motor currents and compute the joint torques using torque sensors in the joints to directly measure the torques or to use position sensors on both sides of the gearbox, using the position difference between the two sensors to compute the torques, taking the elasticity of the gear box as a known quantity.

In a safety-rated manner, it is required to choose two different sources of joint torque information, for example from the above methods, and compare the torque values. If the values differ by more than a predetermined tolerance, it is concluded that an error occurred in the system. If the values lie within a predetermined tolerance range, the torque values can be used to compute application-related quantities. Such application-related quantities can be, for example, Cartesian forces in contact with the environment, for a known position of this contact on the manipulator. Usually this may be a contact force acting at the end-effector of the robot.

SUMMARY

In an embodiment, the present invention provides a method of determining a joint torque in a joint of an articulated industrial robot, the robot having a first arm and a second arm which are coupled to each other by the joint and which are movable relative to each other by an electric drive unit coupled to the first and second arm, comprising: controlling the electric drive unit by an electronic control device; assigning a measuring device to the electric drive unit, the measuring device measuring an electric current supplied to the drive unit; determining an actual value of the torque which is applied to the second arm from the measured electric current; and comparing, using the electronic control device, the determined actual torque value with a predetermined desired torque value for the joint.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is an exemplary comparator for comparing a torque according to the preferred embodiment of the present invention.

DETAILED DESCRIPTION

Figure 1:
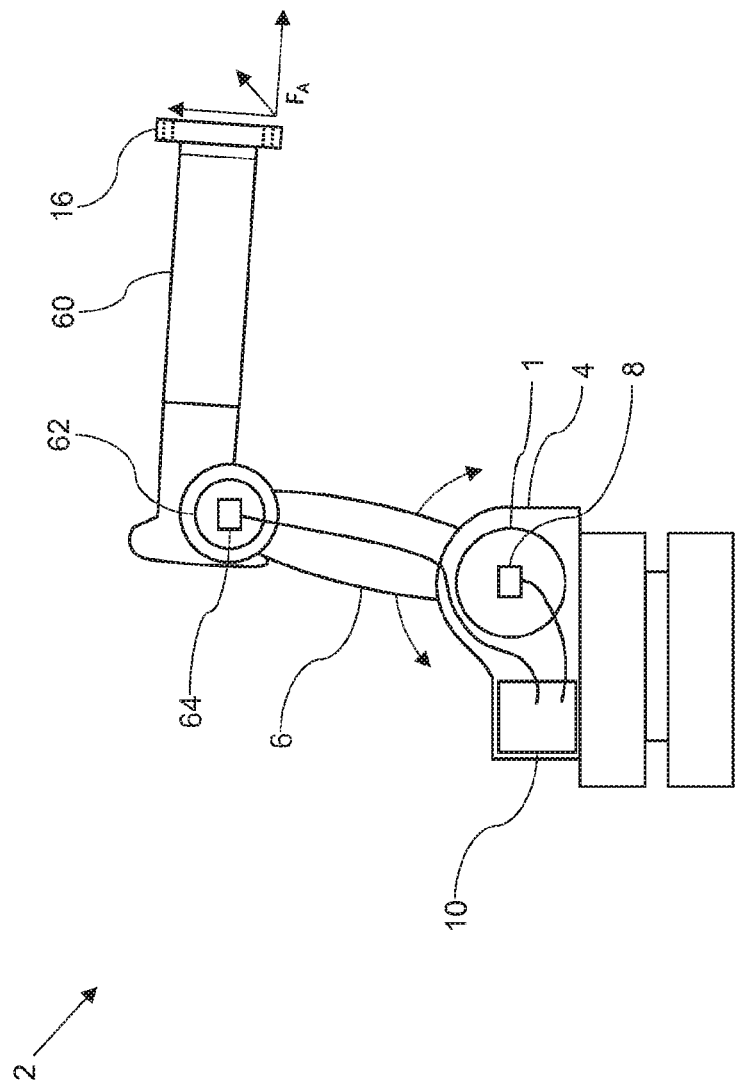
FIG. 1 is a side view of an exemplary articulated industrial robot.

In an embodiment, the present invention provides a method which allows for an improved safety and reduced costs when operating an articulated robot in a collaborative robot application.

According to the invention the method provides for a safety-rated supervision of joint torques of an articulated industrial robot without the need of employing expensive dedicated torque sensors.

The method can be used for example in combination with a standard drive train of an industrial robot joint which includes a servo-motor and a motor angle measurement speed reducer gearbox. Hereinafter, the term motor and drive unit are used as synonyms.

The implementation corresponds to category 3 according to EN ISO 13849-1:2008, which is a requirement for safety functions to be fulfilled when operating an industrial robot according to ISO 10218-1:2011.

According to the invention, two sources of information about the joint torque are used for each joint of the robot. These are the reference torque values which are obtained from dynamic motion planning and the actual torque values which are computed from the respectively measured joint motor currents.

To reach safety performance level PL d, as required by ISO 10218-1:2011, a demonstrated diagnostic coverage (DC) of at least 90% is required.

In order to achieve a sufficient diagnostic coverage for the safety functions, the method proposes to check a trigonometric identity of the overall current fed to the motor and the measured current values of two of the three phases of the motor.

In other words, the method suggests to compare the at least two measured electric phase currents of the electric drive unit with the total current supplied to the drive unit and stop the robot if the difference of these values exceeds a predetermined value. This provides for the advantage that an additional torque sensor in the joint can be omitted while still being able to verify whether the computed torque value is reliable or not.

Moreover, it is advantageous to protect the information against corruption by use of black channel communication according to IEC 61508.

Frictional forces are always acting against the motion of the robot. Therefore, the actual measured torque or force values are always smaller than the computed ones which may also be taken into account by the claimed method. In addition, when the safety function is triggered, it is a further advantage that no additional hazard is caused.

Based on safety-rated torque values for each joint of an articulated robot manipulator, the method of the invention allows to compute a corresponding Cartesian force which any desired point of the manipulator may exert when getting in contact with an object in the environment of the robot when the joint speeds are zero, that is when there are no dynamic forces.

The detection of a failure in the force and/or torque monitoring may be based on a comparison of the joint torque or Cartesian force with a predetermined threshold value. When a criterion is violated, e.g. the determined force or torque value exceeds the threshold value, the system is brought into a safe operating mode. Such an operating mode may be for example the standstill of the robot after a protective stop (robot motion has ceased) or a safety-rated compliant behaviour which is wherein the operator can push the robot aside.

According to another aspect of the invention, it is advantageous to integrate the torque supervision function into a safety controller unit of the robot controller and/or electronic control device, e.g., together with a monitoring/supervision of the position and/or speed. In another embodiment, the torque supervision function is integrated into the main processor of the robot controller which preferably has dual-channel safety-rated architecture, e.g., together with position and speed functions. In a further embodiment, the torque supervision function (joint-related parts) is integrated in the electric current controller for each joint and/or the Cartesian supervision function of forces is implemented in a separate unit or device.

It is a specific advantage of the invention that the method can be applied to protect:

humans from crushing contact events with robots (constrained quasi-static case) and/or workpieces from breaking into parts.

According to the method of the invention for determining joint torques in a joint of an articulated industrial robot, having a first arm and a second arm which are coupled to each other by said joint and which are movable relative to each other by an electric drive unit coupled to said first and second arm, wherein the electric drive unit is controlled by an electronic control device and wherein a measuring device is assigned to said electric drive unit which measures the electric current supplied to the drive unit, an actual value of the torque which is applied to said second arm is determined from said measured electric current and the electronic control device compares said determined actual torque value with a predetermined desired torque value for said joint.

This provides for the advantage that two different sources of comparable torque values are supplied to the electronic control device, which is able to check both values with regard to reliability and dependability, without employing a dedicated torque sensor. A simple check could be for example, if the supplied torque value is within the physical constrains of the robot. In addition, another check could be if both torque values are equal to each other or lie within a certain tolerance range.

In a preferred embodiment of the present invention, the drive unit comprises a three phase alternating current motor. The electric currents of at least two electrical phases of said three phase alternating current motor are measured separately. A first current of a first phase and a second current for a second phase of the motor are measured and compared with a predetermined desired total current value which is supplied to the electric drive unit. With regard to a synchronous three phase electric alternating current motor, it is known that the sum of all three electric phase currents is always zero. According to this assumption, one out of three currents can be calculated if the current values of the other two phases are known.

Moreover, if the amplitude of the electric total current which is supplied to the three phase alternating motor is known, it is possible to check the measured phase currents in view of plausibility.

According to a preferred embodiment of the present invention the electronic control device generates an error signal if the sum of the squared measured current of the first phase $I_U$ and the squared measured current of the second phase $I_V$ plus the product of said measured current of said first phase $I_U$ multiplied with said measured current of said second phase $I_V$ is not equal to three quarters of the squared predetermined desired total current A which is fed to the drive unit plus/minus a threshold value • according to the following relation:

$$[I_U(t)]^2 + I_U(t) * I_V(t) + [I_V(t)]^2 \neq \tfrac{3}{4} A^2 \pm \delta \quad \text{(eq.1)}$$

The left side and the right side of the above-mentioned mathematical relation must be equal in order to be plausible, otherwise the measured currents are not plausible and an error signal may be generated in order to fulfil the requirements for safety-rated supervision. The equation describes the relation between the absolute values of the electrical currents of a three phase alternating motor. The phase angle between each phase is 120° and the sum of all three phase currents amounts to zero. Therefore, the sum of the squared values for each of the three phase currents is equal to one-and-a-half times the squared value of the amplitude of total current which is supplied to the three phase alternating motor. With the simplification that one phase current can be calculated when the two other currents are known, the above given relation can be obtained.

According to another embodiment of the present invention an end effector is mounted to said second arm, and said electronic control device determines an actual force from said determined actual torque value which acts upon said end effector, preferably in Cartesian coordinates.

Pursuant to another object of the present invention the control device includes a motion planning device for said articulated industrial robot, and a desired force which is applied by said end effector is provided to said motion planning device, preferably in Cartesian coordinates, from which the predetermined desired torque value of the joint is determined.

According to yet another embodiment of the claimed method, the desired force which is applied by the end effector, and which is provided to the motion planning device too is compared with the actual force that is applied to the end effector by means of the electronic control device.

In an advantageous embodiment the articulated industrial robot comprises at least one further joint-arm-element, which includes at least one further arm. The at least one further arm is coupled to the second arm by means of a further joint and is movable by means of a further electric drive unit. In this embodiment, the end effector is preferably coupled to the further arm, preferably to the free end thereof.

According to another object of the present invention the measuring device further determines the electrical phase angle of at least one of the phases of said three phase alternating current motor and/or measures the angular velocity of the joint. In this embodiment, the values of the electrical phase angle and/or the angular velocity are fed to the electronic control device.

According to yet another preferred embodiment of the present invention, the method comprises the following method steps:

Providing a predetermined desired torque value for said joint,

Providing an interval $T_{min}$ to $T_{max}$ for a permissible deviation of a calculated actual torque value from said predetermined desired torque value, Controlling said electric drive unit through said electronic control device by means of said predetermined desired torque value, Measuring an actual current of said electric drive unit, Calculating the actual torque value of said joint from said measured actual current of said electric drive unit, Determining a deviation between said actual torque value and said predetermined desired torque value, Comparing said determined deviation with said interval $T_{min}$ to $T_{max}$ for a permissible deviation, Outputting an error signal and/or stopping said articulated industrial robot if said deviation is outside of said interval $T_{min}$ to $T_{max}$ for a permissible deviation.

According to another embodiment said electric drive unit is included in said joint and/or that said electric drive unit includes a gearbox.

FIG. 1 shows a side view of an exemplary articulated industrial robot 2 having a first arm 4 and a second arm 6, which are coupled to each other by a joint 1. In addition, the articulated industrial robot 2 is mounted on a not referenced platform. The first arm and second arm 4, 6 are moveable relative to each other by an electric drive unit 8 which is coupled in a known manner to the first arm 4 and second arm 6. The electric drive unit 8 is controlled by an electronic control device 10. Moreover the industrial robot 2 comprises a further joint-arm-element which includes at least one further arm 60 which is coupled to the second arm 6 by means of a further joint 62. The further arm 60 is moveable by means of a further electric drive unit 64, and the end effector 16 is coupled to the further arm 62.

Figure 2:
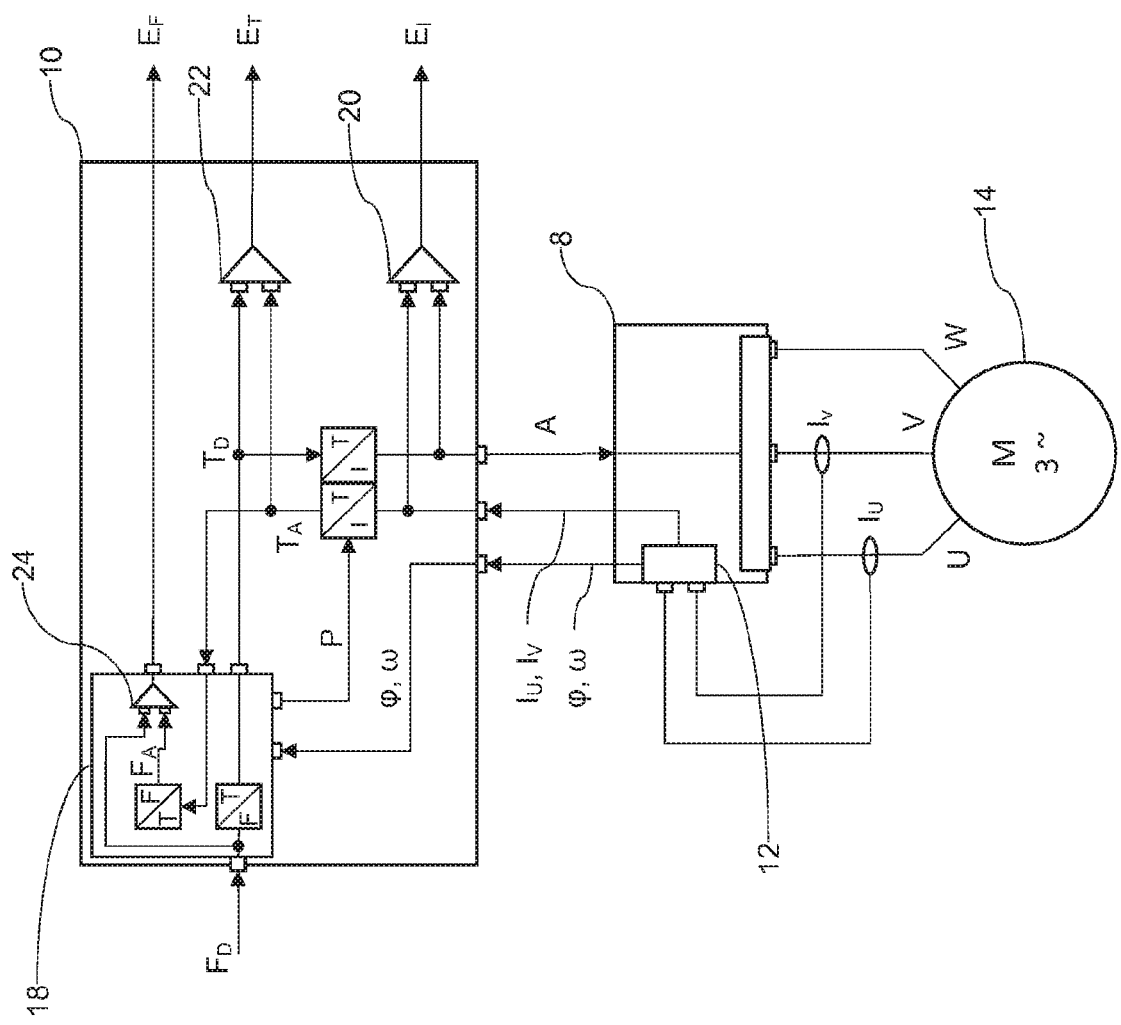
FIG. 2 is an exemplary electronic connection scheme according to the preferred embodiment of the present invention.

FIG. 2 illustrates an exemplary electric connection diagram of a preferred embodiment of the present invention. In this diagram, a desired force $F_D$ preferable in Cartesian coordinates, is provided to the motion planning device 18 which is preferably arranged inside the electronic control device 10.

The motion planning device 18 which may be a known device as it is used for articulated robots, is aware of the kinematics and the kinematic configuration of the articulated industrial robot 2. This means that the motion planning device 18 e.g. knows how the first arm 4 and the second arm 6 are coupled to each other and which are the movement constrains of the joint 1. This allows the motion planning device 18 to calculate the joint torques for a specific motion configuration, e.g. a posture, according to the kinematics or the inverse kinematics. In addition, the motion planning device 18 is able to calculate a joint torque for a specific force, or to retrieve a force for a specific or actual joint torque. This allows the motion planning device 18 to determine a set P of parameters which are needed to calculate the torque from a measured actual electric current and vice versa.

The desired force $F_D$ is converted (calculated) into a desired torque $T_D$ by means of the motion planning device 18. To do so, the desired torque $T_D$ is calculated/converted to a desired electric total current A and supplied to the electric drive unit 8. The electric drive unit 8 is calculating the three phase currents $I_U$, $I_V$, $I_W$ out of the electric total current A for each phase U, V, W of the three phase alternating current motor 14.

The measuring device 12 is measuring the electric phase current of at least two phases $I_U$, $I_V$. Moreover, the measuring device 12 is determining and/or measuring the phase angle • and/or angular velocity • of at least one phase U, V, W and is providing the measured or determined quantity to said electronic control device 10 and preferable also to said motion planning device 18.

The actual electric current $I_U$, $I_V$ is checked against the total electric current A by an electric current comparator 20 according to the above-mentioned equation eq.1. If the equation is satisfied, an error signal $E_I$ is generated which indicates a plausible failure. This means for example, that the motion planning device 18 wants to move the robot 2 to a specific position or posture with a desired force $F_D$, but a human next to the robot 2 is pushing against the second arm 6 of the robot 2. This leads to a deviation in motor currents, so that the total desired current A is not equal to the measured and calculated sum of currents $I_U$, $I_V$ and $I_W$. It shall be remarked that this example does not necessarily always lead to an appropriate deviation in torque, so that a comparison of the measured and calculated currents $I_U$, $I_V$ alone may not be sufficient to detect a collision with a human in reliable manner.

To do so, the measured actual currents $I_U$, $I_V$ are converted (computed) into an actual torque $T_A$ and preferably provided to said motion planning device 18 and/or the torque comparator 22. The torque comparator 22 checks the actual torque $T_A$ against the desired torque $T_D$. If an appropriate deviation is detected, an error signal $E_T$ is generated and the robot stopped or put into a safe operating mode.

In this respect, the motion planning device 18 is determining an actual force value $F_A$ from the actual torque value $T_A$. Moreover, it provides the desired Force $F_D$ and the actual force $F_A$ to a force comparator 24. If an appropriate deviation in force is detected, an error signal $E_F$ is generated.

The error signals $E_I$, $E_T$, $E_F$ are preferable provided to an external interface (not shown) of the electronic control device 10 for further processing, e.g. stop other nearby industrial robots.

FIG. 3 illustrates an exemplary torque comparator 24. The desired torque $T_D$ and the actual torque $T_A$ are provided to said torque comparator 24 with all values being time-dependent. The actual torque value $T_A$ is compared to the desired torque value $T_D$ plus/minus a tolerance value. The upper boundary is indicated as $T_{max}$ and the lower boundary is indicated as $T_{min}$. If $T_A$ is above $T_{max}$ or below $T_{min}$, as indicated by the flash, an error signal $E_T$ is generated.

If one of the error signals $E_I$, $E_T$, $E_F$ is generated, the industrial articulated robot 2 is preferably stopped or put into a safe operating mode.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS

1 Joint
2 Articulated industrial robot
4 First arm of said articulated industrial robot 2
6 Second arm of said articulated industrial robot 2
8 Electric drive unit
10 Electronic control device
12 Measuring device
14 Three phase alternating current motor
16 End effector
18 Motion planning device
20 Electric current comparator
22 Torque comparator
24 Force comparator
60 Further arm
62 Further joint
64 Further electric drive unit
M Motor
3~ 3 phase alternating current
T Torque
$T_A$ Actual torque value
$T_D$ Desired torque value
$T_{min}$ Minimum permissible deviation
$T_{max}$ Maximum permissible deviation
$T_{Diff}$ Torque deviation
U First phase
V Second phase
I Electric current
$I_U$ Measured electric current of said first phase U
$I_V$ Measured electric current of said second phase V
A Desired electric total current of said drive unit 8
$E_I$ Error signal for electric current mismatch $E_T$ Error signal for torque mismatch
$E_F$ Error signal for force mismatch
• Threshold value to encounter measurement inaccuracy
F Force
$F_A$ Actual Force
$F_D$ Desired Force
• Electric phase angle
• Angular velocity
P Electric current to torque calculation parameter

What is claimed is:

1. A method of determining a joint torque in a joint of an articulated industrial robot, the robot having a first arm and a second arm which are coupled to each other by the joint and which are movable relative to each other by an electric drive unit coupled to the first and second arm, comprising:
controlling the electric drive unit by an electronic control device;
assigning a measuring device to the electric drive unit, the measuring device measuring an electric current supplied to the drive unit;
determining an actual value of the torque which is applied to the second arm from the measured electric current; and
comparing, using the electronic control device, the determined actual torque value with a predetermined desired torque value for the joint.

2. The method of claim 1, wherein the drive unit comprises a three phase alternating current motor and the electric currents of at least two electrical phases of the three phase alternating current motor are measured separately, and
wherein a first measured current for a first phase and a second measured current for a second phase are compared with a predetermined desired total current supplied to the electric drive unit.

3. The method of claim 2, wherein the electronic control device generates an error signal if a sum of a squared measured current of the first phase and a squared measured current of the second phase plus a product of the measured current of the first phase multiplied with the measured current of the second phase is not equal to three quarters of a squared predetermined desired total current supplied to the drive unit plus or minus a threshold value according to the following relation:

$$[I_U(t)]^2 + I_U(t)*I_V(t) + [I_V(t)]^2 \neq 3/4 A^2 \pm \delta \quad \text{(eq. 1)}.$$

4. The method of claim 1, wherein an end effector is mounted to the second arm, and
wherein the electronic control device determines an actual force from the determined actual torque value which acts upon the end effector.

5. The method of claim 4, wherein the control device includes a motion planning device for the articulated industrial robot, and
wherein a desired force which is applied by the end effector is provided to the motion planning device, from which the predetermined desired torque value for the joint is determined.

6. The method of claim 5, wherein the desired force applied by the end effector which is provided to the motion planning device is compared with the actual force applied to the end effector by the electronic control device.

7. The method of claim 4, wherein the articulated industrial robot comprises at least one further joint-arm-element which includes at least one further arm that is coupled to the second arm by a further joint and is movable by a further electric drive unit, the end effector being coupled to the further arm.

8. The method of claim 2, wherein the measuring device further determines an electrical phase angle of at least one phase of the three phase alternating current motor and/or measures the angular velocity of the joint, and
wherein the electrical phase angle and/or the angular velocity are provided to the electronic control device.

9. The method of claim 1, further comprising the following method steps:
providing a predetermined desired torque value for the joint,
providing an interval for a permissible deviation of a calculated actual torque value from the predetermined desired torque value,
controlling the electric drive unit through the electronic control device by the predetermined desired torque value,
measuring an actual current of the electric drive unit,
calculating the actual torque value of the joint from the measured actual current of the electric drive unit,
determining a deviation between the actual torque value and the predetermined desired torque value,
comparing the determined deviation with the interval to for a permissible deviation,
outputting an error signal and/or stopping the articulated industrial robot if the deviation is outside of the interval to for a permissible deviation.

10. The method of claim 1, wherein the electric drive unit is included in the joint, and/or
wherein the electric drive unit includes a gearbox.

11. The method of claim 4, wherein actual force is determined in Cartesian coordinates.

12. The method of claim 5, wherein the desired force is provided in Cartesian coordinates.

* * * * *